United States Patent [19]

Shiga et al.

[11] 4,098,127
[45] Jul. 4, 1978

[54] BALANCING METHOD FOR USE IN MULTIPLE-SPAN ROTOR SHAFT SYSTEM AND BALANCING SYSTEM USING SAME

[75] Inventors: Motohiro Shiga, Hitachi; Fumio Fujisawa, Mito; Kazuo Sato, Kitaibaraki; Kouki Shiohata, Hitachi; Masakazu Takasumi, Ibaraki; Tsuguaki Koga, Hitachi, all of Japan

[73] Assignee: Hitachi, Ltd., Japan

[21] Appl. No.: 728,183

[22] Filed: Sep. 30, 1976

[30] Foreign Application Priority Data

Apr. 12, 1976 [JP] Japan .................................. 51-41153

[51] Int. Cl.² ........................................ G01M 1/16
[52] U.S. Cl. ...................................... 73/462; 364/463
[58] Field of Search ...................... 73/462; 235/151.3

[56] References Cited

U.S. PATENT DOCUMENTS

| 2,799,168 | 7/1957 | Federn et al. ........................ 73/462 |
| 3,071,972 | 1/1963 | Koenig .................................. 73/462 |
| 3,077,781 | 2/1963 | Silver ..................................... 73/465 |
| 3,380,286 | 4/1968 | Porter ................................. 73/462 X |

Primary Examiner—James J. Gill
Attorney, Agent, or Firm—Craig & Antonelli

[57] ABSTRACT

A balancing method for use in a multiple-span rotor shaft system for a prime mover, such as a large-capacity, large-sized steam turbine and generator. A balancing influence coefficient representing the relationship between a unit weight and the resultant vibration, when the aforesaid unit weight is attached to a given balance-correcting plane of a multiple span rotor, is first determined, and then a balance-correcting plane, to which is to be attached a balancing weight, is selected, then a balancing weight is determined so as to minimize the value of the residual vibration amplitude, by using the method of least squares, which values are dependent on the value of the vibration amplitude, influence coefficients and balancing weights. Thus, a weight corresponding to the aforesaid balancing weight is attached to the aforesaid balance-correcting plane to reduce vibrations in a shaft.

9 Claims, 20 Drawing Figures

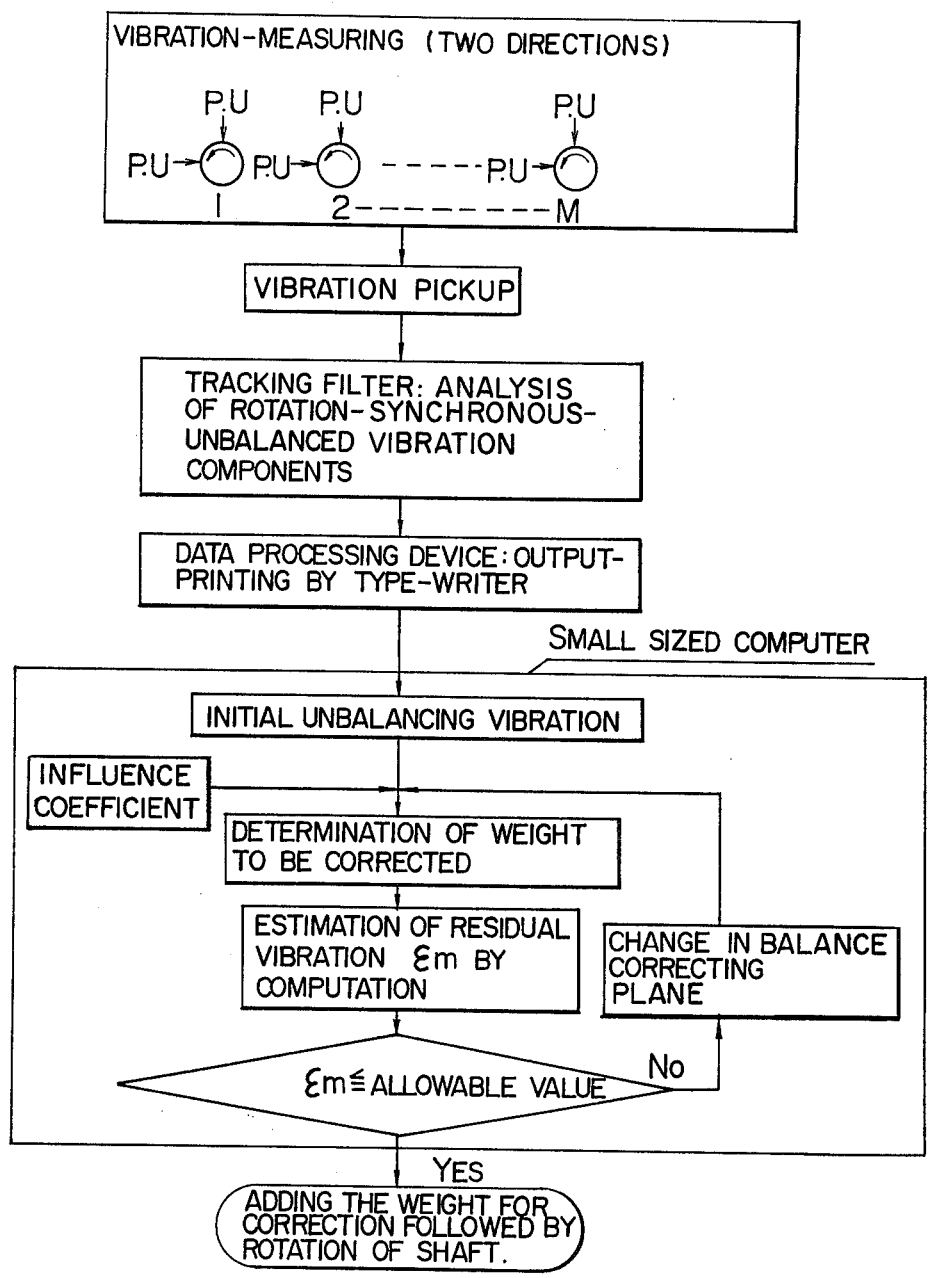

- ● BEFORE BALANCING
- ▲ AFTER BALANCING (VERTICAL DIRECTION)
- ■ AFTER BALANCING (HORIZONTAL, VERTICAL DIRECTIONS)

BALANCING METHOD FOR USE IN MULTIPLE-SPAN ROTOR SHAFT SYSTEM AND BALANCING SYSTEM USING SAME

This invention relates to a balancing method for a rotary machine, and more particularly to a balancing method suitable for use in a large-capacity, large-sized steam turbine and a generator.

In general, it is often that a rotating portion of a rotary machine is not completely or absolutely symmetric with respect to its center axis, presenting a somewhat unbalanced condition. Such an unbalanced condition results in vibration in a shaft during the operation of the rotary machine. Excessive vibrations lead to an abnormal condition in bearing portions, thus failing to achieve the normal rotation of a shaft. In addition, a force which causes the aforesaid excessive vibrations is considerable and acts on the shaft, thereby presenting a possibility of the shaft being damaged. An allowable maximum value is determined for the limit of vibrations in a shaft to prevent an accident arising from the aforesaid shaft vibration. For this reason, the rotating portion is subjected to a rotation test. In case the aforesaid allowable maximum value is exceeded, then a balancing weight is attached to the rotating portion for reducing the degree of unbalance, thereby reducing vibrations. Such an operation is referred to as balancing.

A steam turbine and a generator provide a multiple bearing system, wherein a plurality of shafts, the opposite ends of which are supported in bearings, are coupled to one another. In general, it is customary that shafts are respectively tested for balancing. A balancing procedure is as follows;

(1) measure vibrations in shaft at bearing positions;

(2) select balance-correcting plane, i.e., positions on a shaft, to which balancing weights are to be attached;

(3) attach a trial weight to a balance correcting plane, and then measure its influence on shaft vibrations. Determine shaft vibrations caused by a unit weight, i.e., an influence coefficient of the unit weight from the above result;

(4) determine a balancing weight to nullify vibrations by utilizing initial vibrations, i.e., shaft vibrations in the initial condition and influence coefficients;

(5) attach the thus determined weight to the balance correcting plane of the rotating portion. Then, operate it in this condition, and confirm that shaft vibrations fall within an allowable range, thus completing the balancing operation.

When a steam turbine and a generator completed in a factory are assembled in a power plant, then some degree of unbalance would result. This dictates a balancing operation by rotating a shaft system. Hitherto, in such a case, attention is drawn to a shaft which causes large shaft vibrations, and then balancing is carried out for the shaft for reducing the vibrations. Thereafter, balancing is given to a shaft causing the next greatest vibrations.

In like manner, shafts are subjected to balancing in turn, thereby reducing shaft vibrations to below the maximum allowable level, thus completing a balancing operation.

With a recent large-capacity, large-sized steam turbine and a generator, a plurality of shafts are coupled together, and these shaft systems affect each other, thereby presenting a complex vibratory configuration. Thus, it is more difficult to reduce the shaft vibrations to below a given level. According to the prior art balancing operation, a plurality of the cycles of balancing operation are required for determining influence coefficients, with the accompanying expenditure of much time and efforts. Meanwhile, even if a balancing weight is determined, it is difficult to estimate what kind of vibrations would take place, until a balancing weight is attached to the rotating portion and the rotary machine actually operated. Thus, there exists some uncertainty in the determination of a balancing weight. Furthermore, if each shaft of a multiple shaft system has to be subjected to balancing, as in the case of a power plant, many cycles of operations are required until the balancing operation is completely finished.

The method of measurement of shaft vibrations is carried out, with a single vibration pickup attached at one point. For this reason, vibrations only in the direction of the vibration pickup to be attached are measured, i.e., vibrations in one direction. According to the prior art balancing method, vibrations in one direction are only measured in one measuring position, thus failing to accurately measure vibrations within a plane, two-dimensionally. As a result, poor accuracy results in vibrations which are utilized for the computation of the balance weight, and hence the balancing weight thus obtained is not necessarily optimum value for reducing the unbalance in the shaft. The prior art balancing still leaves room for improvements in accuracy. In addition, a balancing weight is computed by using inaccurate vibration measurements, so that an optimum balancing weight can not be obtained, and thus many cycles of balancing operations must be performed, until complete balancing is obtained.

It is an object of the present invention to provide a balancing method which may avoid the shortcomings in the prior art method and efficiently reduce the degree of shaft vibrations in a rotary machine.

It is another object of the present invention to provide a balancing system which may avoid the shortcomings incurred in the determination of the correct balance, and enables the determination of the balancing weight and measurements of vibrations with high accuracy.

According to the present invention, there is determined by computation shaft vibrations which take place when an unbalance occurs in a shaft system to be balanced, and then an influence coefficient is determined from the result thus obtained. Then, the initial vibrations are measured and then a balancing weight is determined by utilizing the measurements and influence coefficients obtained from computation. In addition, the shaft vibrations, when a balancing weight thus obtained is attached, is estimated by computation, then conforming that the shaft vibrations after balancing based on the aforesaid results fall in an allowable range, and then determining a balancing weight. The balancing weight thus obtained is attached to a rotary shaft, which is then operated for confirmation, completing balancing of a shaft. The above method is characterized by the simultaneous reduction of all of shaft vibrations at many rotational speeds, including the critical speeds and rated speeds, by attaching balancing weights to balance-correcting planes.

The balancing method for use in a multiple span rotor shaft system is provided according to the present invention, which method comprises the steps of: determining a balance influence coefficient representing the relationship between a unit weight and the resultant vibrations, when said unit weight is attached to a given balance-correcting plane; selecting balance-correcting planes of the multiple span rotor, to which are attached balancing weights; determining balancing weights so as to minimize the value of the residual vibration amplitude by using a method of least squares, the aforesaid vibration amplitude being dependent on the value of the initial vibration amplitude influence coefficients and balancing weights; attaching to said balance-correcting planes weights corresponding to said balancing weights to thereby reduce the shaft vibrations.

The balancing influence coefficient may be determined according to computation from the specification of a multiple span rotor, or by measuring vibrations directly. In place of the aforesaid weights, it is possible for reducing shaft vibrations to determine compensating balancing weights so as to minimize the sum of square values of residual vibration amplitudes multipled by weight factors obtained from the square root of the square sum mean of the residual vibration amplitudes and the residual vibration amplitudes and then to attach weights corresponding to the aforesaid compensating balancing weights to the aforesaid balance-correcting planes, thereby reducing shaft vibrations.

When a mass of a weight to be attached is limited, the aforesaid compensating balancing weights are recompensated so as to minimize the sum of the square value of the residual vibrations amplitudes multiplied by weight factors obtained from the square root of the square sum mean of the vibration amplitude and the residual vibration amplitudes, and a product of the square value of the aforesaid compensating balancing weights and weight restricting factors (the factors representing the degree of importance of a balance of weight), and then weights corresponding to the aforesaid re-compensated balancing weights are attached to the aforesaid correcting planes, to thereby reduce shaft vibrations.

According to the present invention, there is provided a balancing system for use in a rotary machine, comprising a vibrometer for measuring vibrations in the multiple span rotor shaft system, and an electric computer which computes balancing influence coefficients representing the relationship between a unit weight and vibrations, when the aforesaid unit weight is attached to a given balance-correcting plane, and then compute balancing weights so as to minimize the residual vibration amplitudes depending on the initial vibration amplitudes, influence coefficients and balancing weights.

The inventor studied the vibrating configuration of a shaft in a plane perpendicular to the axial direction in a vibration-measuring position. As a result, it was found that rigidity of a supporting portion for a shaft varies depending on a given direction in the above plane, so that the locus of vibrations in this plane presents an elliptic shape. In other words, vibrations vary in this plane two-dimensionally.

The present invention presents a highly efficient, highly accurate balancing system, comprising the steps of: measuring unbalanced vibrations occuring during the rotation of a rotary shaft system, in two directions intersecting at a right angle in bearing journal portions; analyzing vibrations into rotation-synchronous components by using a tracking filter; determining optimum balance-correcting weights for reducing unbalance vibrations by using a small sized electric computer, utilizing the rotation-synchronous-unbalanced vibrations as well as influence coefficients which have been obtained beforehand; and estimating vibrations, when the balance-correcting weights are attached.

FIG. 18 is a flow chart of a balancing system according to the invention; and

Figure 1:
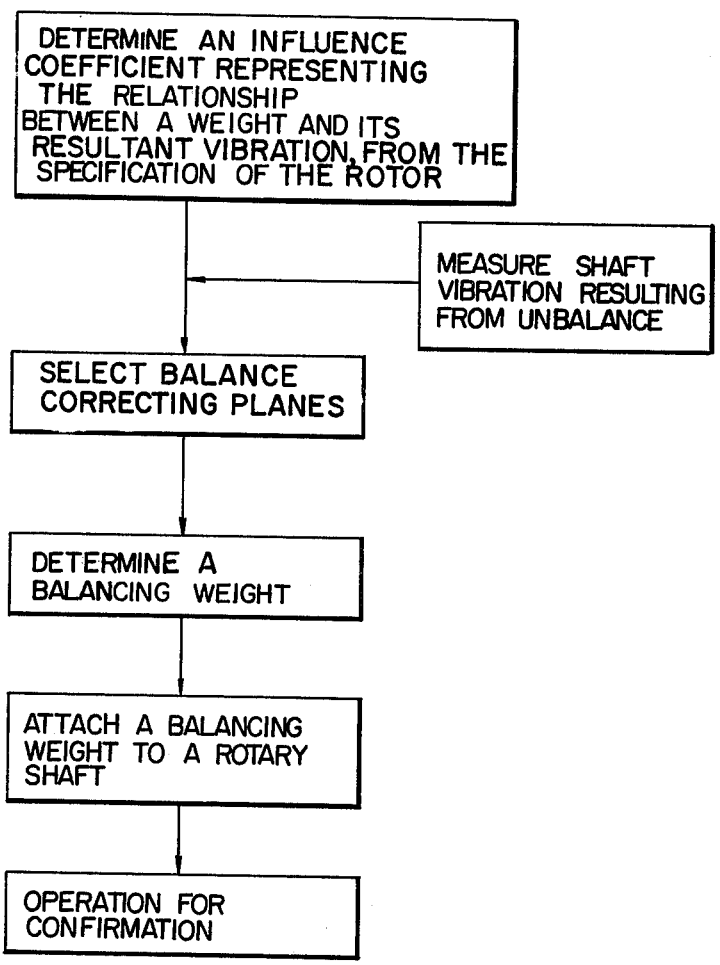
FIG. 1 is a view illustrative of the balancing method for use in a rotary machine according to the present invention.

One embodiment of the present invention will be described in more detail by referring to FIG. 1. The method according to the present invention includes the steps of: determining influence coefficients representing the relationship between a weight and the resultant vibrations, from the specification of the rotor; measuring shaft vibrations occuring due to unbalance; selecting balance-correcting planes of the shaft, to which balancing weights are to be attached; and determining balancing weights to be attached to the balance-correcting surfaces, based on the influence coefficients obtained from the results of measurements of shaft vibrations and the computation. Then, balancing weights thus obtained are attached to a rotary shaft, which is then operated for confirming that vibrations are reduced, thus completing balancing.

Figure 2:
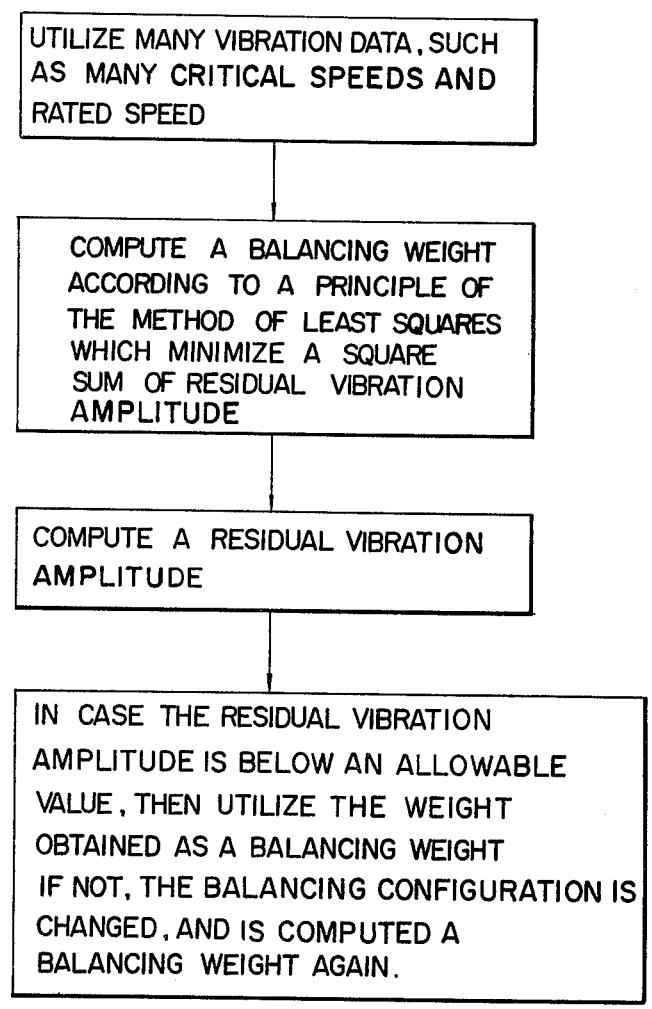
FIG. 2 is a view illustrative of the method for determining a balancing weight.

Description will be given of the method for determining a balancing weight with reference to FIG. 2. According to this method, a balancing weight is computed by utilizing a principle of the method of least squares so as to minimize the sum of the squares of residual vibration amplitudes after attaching weights to the balance correcting planes, while utilizing the results of measurements of shaft vibrations at many speeds, including the critical speed and rated speed. Then, values of vibrations after a balancing weights thus obtained have been attached, i.e., residual vibration amplitudes are determined by computation. In case the residual vibrations amplitudes fall within an allowable range, then the balancing weights thus obtained are used as final balancing weights. If the residual vibrations amplitudes are out of the allowable range, then the balancing configuration is varied to carry out the computation of the balancing weights again.

The present invention is characterized by the determination of balancing weights, taking into consideration the vibration amplitudes after balancing weights have been attached.

A factor representing the relationship between a weight and vibrations, i.e., an influence coefficient should be determined by computation beforehand. To this end, a vibration characteristic resulting when a weight causing an unbalance is attached to a balance-correcting plane of a rotary shaft is computed, and then the amplitude of vibrations in a vibration-measuring position, when a unit weight is attached to the balance-correcting plane, is determined from the results thus obtained to be utilized as an influence coefficient for use in computing a balancing weight. The vibration characteristic of a shaft system may be computed by using values used in the specification of a rotor, such as dimensions of a shaft system, weights of supporting portions during the rotation, a supporting condition such as oil film characteristics.

Figure 3:
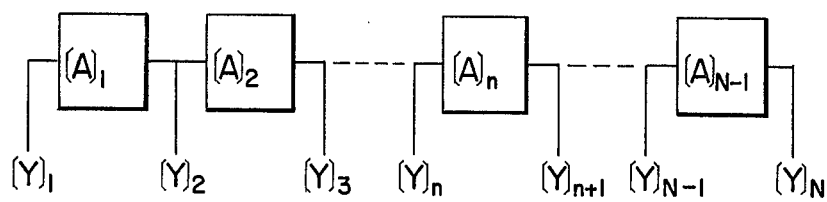
FIG. 3 is a view illustrative of a transfer matrix.

The analysis of a shaft system may be carried out by using a transfer matrix method. This method is carried out as follows;

A shaft system is divided into elements such as a beam portion, concentrated mass, and coupling portion by means of a spring. Then, the vibration system is composed as shown in FIG. 3 by using a matrix of state vector [Y] consisting of values such as slope, deflection, shear stress or force, and moment in the dividing positions, and a transfer matrix [A] of elements representing the relationship between the values of the elements.

Assume deflections $Vx$, $Vy$ (cm), slopes $\theta x$, $\theta y$ (rad), shear stresses or forces $Vx$, $Vy$ (kg), and bending moments $Mx$, $My$ (kg cm), then state vector [Y] will be given as follows; (wherein $x$ represents values of the horizontal vibrations, while $y$ represents values of the vertical vibrations.

$$[Y] = \begin{bmatrix} v \\ \theta \\ M \\ V \end{bmatrix}$$

$$[v] = \begin{bmatrix} Vx \\ Vy \end{bmatrix} \quad [\theta] = \begin{bmatrix} \theta x \\ \theta y \end{bmatrix}$$

$$[V] = \begin{bmatrix} Vx \\ Vy \end{bmatrix} \quad [M] = \begin{bmatrix} Mx \\ My \end{bmatrix}$$

The transfer matrix [A] may be computed by the elements. For instance, the transfer matrix [A] for the horizontal vibrations of a beam element having a uniform cross section is given below:

$$[A] = \begin{bmatrix} C_o & lC_1 & aC_2 & alC_3 \\ \frac{\beta^4}{l} C_3 & C_o & \frac{a}{l} C_1 & aC_2 \\ \frac{\beta^4}{a} C_2 & \frac{\beta^4 l}{a} C_3 & C_o & lC_1 \\ \frac{\beta^4}{al} C_1 & \frac{\beta^4}{a} C_2 & \frac{\beta^4}{l} C_3 & C_o \end{bmatrix}$$

$C_o = \frac{1}{2}(\cosh\beta + \cos\beta)$, $C_1 = \frac{1}{2\beta}(\sinh\beta + \sin\beta)$ $C_2 = \frac{1}{2\beta^2}(\cosh\beta - \cos\beta)$, $C_3 = \frac{1}{2\beta^3}(\sinh\beta - \sin\beta)$ $a = \frac{l^2}{EI}$, $\beta^4 = \frac{\mu\omega^2}{EI} l^4$ wherein
$l$: length (cm) E: Young's modulus (kg/cm$^2$)
I: geometrical moment of inertia (cm$^4$)
$\omega$: circular frequency (rad/s)
$\mu$: mass per unit length (CKgs$^2$/cm$^2$)

The matrix of state vector [Y] before and after this element, is given as below:

$$[Y]_{n+1} = \begin{bmatrix} Vx \\ \theta x \\ Mx \\ Vx \end{bmatrix}_{n+1} = [A] \begin{bmatrix} Vx \\ \theta x \\ Mx \\ Vx \end{bmatrix}_n$$

The transfer matrix [A] for a concentrated weight is given below:

$$[A] = \begin{bmatrix} 1 & 0 & 0 & 0 \\ 0 & 1 & 0 & 0 \\ 0 & m\omega^2 i^2 & 1 & 0 \\ m\omega^2 & 0 & 0 & 1 \end{bmatrix}$$

wherein
$m$: mass (Kg S$^2$/cm)
$i$: radius of gyration (cm)
$\omega$: circular frequency (rad/s)

In the position where a weight causing an unbalance is attached, an increase in shear stress or free results due to a centrifugal force caused by the resultant unbalance.

In this case, the boundary condition at a shaft end is free and a force matrix [P] consisting of a state vector such as force and moment is nullified:

$$[P] = 0$$

A computing method for vibration-amplitude relating to forced vibrations will be described hereinafter. Assume that vibrations follow a sin wave having a circular frequency $\omega$ (rad/s). The vibration-amplitude is a vector having a magnitude and phase. Here now, a complex number is used for representing values having such a magnitude and a phase. As a result, elements of the matrix of state vector [Y] and transfer matrix [A] will be represented by complex numbers.

The matrix of state vector [Y]$_1$ at one end is expressed by an unknown matrix [X], by using the boundary condition in its position:

$$\begin{bmatrix} Y \\ 1 \end{bmatrix}_1 = \begin{bmatrix} D \\ P \\ 1 \end{bmatrix}_1 = \begin{bmatrix} I & 0 \\ 0 & 0 \\ 0 & 1 \end{bmatrix} \begin{bmatrix} X \\ 1 \end{bmatrix} \quad (1)$$

wherein
[I]: unit matrix

[X]: unknown matrix

The term [1] in $$\begin{bmatrix} X \\ 1 \end{bmatrix} \text{ and } \begin{bmatrix} Y \\ 1 \end{bmatrix}$$

in the equation (1) represents those which have no connection with the unknown matrix [X] on the boundary, such as a vibratory force acting on a vibration system, in computing a transfer matrix.

Between the transfer matrix [A] and the matrixes of state vector $$\begin{bmatrix} Y \\ 1 \end{bmatrix}_n, \quad \begin{bmatrix} Y \\ 1 \end{bmatrix}_{n+1}$$

before and after the matrix [A] give the following relation:

$$\begin{bmatrix} Y \\ 1 \end{bmatrix}_{n+1} = [A]_n \begin{bmatrix} Y \\ 1 \end{bmatrix}_n \quad (2)$$

The transfer matrix $[A]_n$ may be computed for each element, so that from the equations (1) and (2), the matrix of state vector $$\begin{bmatrix} Y \\ 1 \end{bmatrix}_n$$

at each position may be expressed as a function of a matrix $$\begin{bmatrix} X \\ 1 \end{bmatrix},$$

as follows:

$$\begin{bmatrix} Y \\ 1 \end{bmatrix}_n = [B]_n \begin{bmatrix} X \\ 1 \end{bmatrix} \quad (3)$$

The following equation may be obtained from the equations (2) and (3):

$$\begin{bmatrix} Y \\ 1 \end{bmatrix}_{n+1} = [B]_{n+1} \begin{bmatrix} X \\ 1 \end{bmatrix} = [A]_n \begin{bmatrix} Y \\ 1 \end{bmatrix}_n$$

$$= [A]_n [B]_n \begin{bmatrix} X \\ 1 \end{bmatrix}$$

Accordingly, $[B]_{n+1} = [A]_n [B]_n$ \quad (4)

$$\begin{bmatrix} Y \\ 1 \end{bmatrix}_1 = [B]_1 \begin{bmatrix} X \\ 1 \end{bmatrix}.$$

Then, this equation and the equation (1) determine $[B]_1$.

$$[B]_1 = \begin{bmatrix} 1 & 0 \\ 0 & 0 \\ 0 & 1 \end{bmatrix} \quad (5)$$

$[B]_n$ may be computed by using the transfer matrix [A], and equations (4) and (5). Accordingly, $[B]_n$ may be obtained from the equation (3), assuming the matrixes of state vector $[Y]_n$ at respective positions as a function of a unknown matrix $$\begin{bmatrix} X \\ 1 \end{bmatrix}.$$

The matrix of state vector $$\begin{bmatrix} Y \\ 1 \end{bmatrix}_N.$$

at the other end is given as below:

$$\begin{bmatrix} Y \\ 1 \end{bmatrix}_N = [B]_N \begin{bmatrix} X \\ 1 \end{bmatrix}$$

On the other hand, the condition [P] = 0 may be obtained from the boundary condition in this position, so that an equation relating to an unknown matrix [X] may be obtained. Thus, [X] may be obtained from the solution of the aforesaid equation.

$$\begin{bmatrix} Y \\ 1 \end{bmatrix}_N = \begin{bmatrix} D \\ P \\ 1 \end{bmatrix}_N = [B]_N \begin{bmatrix} X \\ 1 \end{bmatrix} = \begin{bmatrix} C_{11} & C_{12} \\ C_{21} & C_{22} \\ 0 & 1 \end{bmatrix} \begin{bmatrix} X \\ 1 \end{bmatrix}$$

$$[P]_N = [C_{21} \quad C_{22}] \begin{bmatrix} X \\ 1 \end{bmatrix} = 0$$

$$[X] = -[C_{21}]^{-1} [C_{22}]$$

The equation (3) is substituted by the unknown matrix [X] thus obtained for computing the value of matrix [Y] in the respective positions. In this manner, the amplitude of vibration may be obtained for the entire vibration system.

Figure 4:
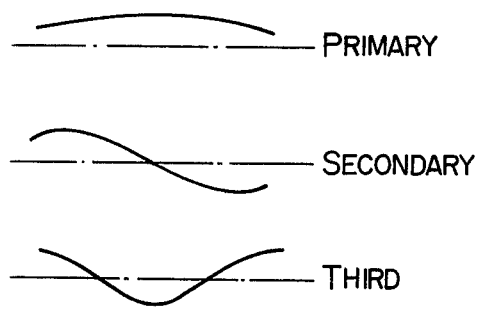
FIG. 4 is a view illustrative of a vibrating mode.
Figure 5:
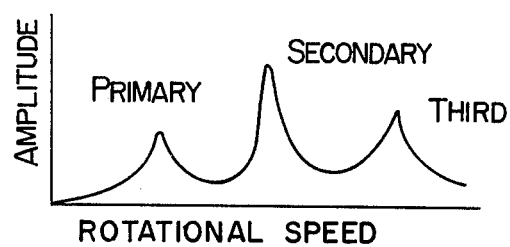
FIG. 5 is a plot showing the relationship between rotational speed and amplitude.

Balance-correcting planes may be selected by using the vibration characteristics of a shaft system. To this end, the vibration characteristics of the shaft system, when a weight causing an unbalance is attached thereto, is computed for utilizing the results to be obtained. FIG. 4 shows the vibrating mode at a natural frequency of the shaft supported at its opposite ends. The vibrations mode at primary to third natural frequencies are such that the directions of the primary vibrations remain the same over the entire length of the shaft, the amplitude of the secondary vibrations is at the minimum at the midpoint of the shaft, with the directions of vibrations at the opposite ends being reversed, and the direction of the third vibrations is one way at the midpoint of the shaft, and another at the opposite ends of the shaft. The rotary machine tends to cause vibrations due to unbalance during operation. The vibrations of this kind are apt to increase or decrease, with an increase in rotational speed, as shown in FIG. 5. The rotary shaft has an inherent rotational speed which causes severe vibration, and this speed is referred to as a critical speed. As shown in FIG. 5, three critical speeds appear. These are referred to as a primary, secondary, and third critical speeds, respectively. The vibrating modes at these critical speeds correspond to the vibration characteristics of a shaft system shown in FIG. 4.

Figure 6:
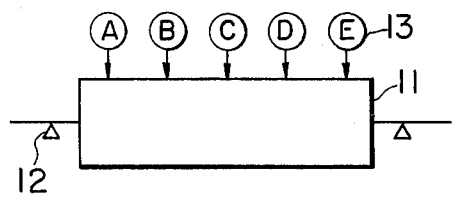
FIG. 6 is a view illustrative of a balance correcting plane.
Figure 7:
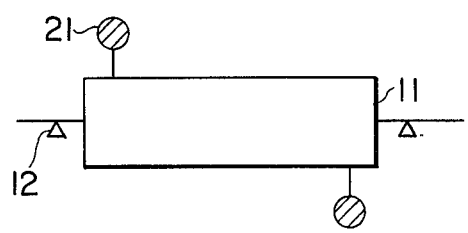
FIG. 7 is a view illustrative of the balancing weight for the secondary vibration mode.

By utilizing the vibratory characteristic of the shaft system shown in FIG. 4, the balance-correcting planes are determined from the results of measurements of vibrations in a shaft. Description will be given of the case where the vibrations at the secondary critical speeds are large, and the vibrations at the primary and third critical speeds are small. Firstly, assume that the five balance-correcting planes are shown as at A to E in FIG. 6. The balance-correcting planes which are effective for the second critical speed are shown at A and E which are close to the opposite ends of the shaft. Thus, it is recommended that the directions of weights to be attached to both balance-correcting planes 13 be opposite to each other as shown in FIG. 7. In this manner, the vibrations at the second critical speed may be reduced, yet exerting no adverse influence on the vibrations at the primary critical speed.

According to the balancing method of the invention, an attempt is made so as to determine weights which may reduce the vibrations in these conditions, by utilizing the data regarding several critical speeds and the rated speed. In other words, an attempt is made so as to reduce shaft vibrations at all critical speeds, such as the primary, secondary and third critical speeds. The method for computation herein utilizes the method of least squares so as to minimize the sum of the square vibrations amplitudes after attaching weights, i.e., residual vibrations amplitudes, in an attempt to reduce shaft vibrations of the number more than the number of balance-correcting planes. The residual vibration amplitude value is defined as follows:

$$\epsilon_m = A_m + \sum_{n=1}^{N} \alpha_{mn} W_n \tag{6}$$

wherein $\epsilon_m$: residual vibration amplitude
$A_m$: initial vibration amplitude
$\alpha_{mn}$: influence coefficient
$\omega_n$: weights on respective balance-correcting planes
$n$: number corresponding to the positions of balance-correcting planes $1 \leq n \leq N$
$N$: number of balance-correcting planes
$m$: number corresponding to the measuring positions and condition of shaft vibrations $1 \leq m \leq M$
$M$: product of the number of the measuring positions and measuring condition For computing the balancing weights, an evaluation function is used as follows:

$$J = \sum_{M=1}^{M} |\epsilon_m|^2 \tag{7}$$

A balancing weight $W_n$ is determined under the condition where the evaluation function J is minimized. To this end, the evaluation function J is partially differentiated by $W_n$, and then the term thus obtained is made equal to zero, as follows:

$$\frac{\delta J}{\delta W_n} = 0 \tag{8}$$

From the above equation, an equation for computing Wn is obtained as follows:

$$[W] = -\{[\beta][\alpha]\}^{-1}[\beta][A] \tag{9}$$

$[W] = \begin{bmatrix} W_1 \\ \vdots \\ W_N \end{bmatrix}$ : column vector of balancing weight $[\alpha] = \begin{bmatrix} \alpha_{11} \cdots \alpha_{1N} \\ \vdots \quad \vdots \\ \alpha_{M1} \cdots \alpha_{MN} \end{bmatrix}$ : matrix of influence coefficient $[\beta] = \begin{bmatrix} \alpha_{11} \cdots \alpha_{M1} \\ \vdots \quad \vdots \\ \alpha_{1N} \cdots \alpha_{MN} \end{bmatrix}$ : transposed matrix of influence coefficient $[A] = \begin{bmatrix} A_1 \\ \vdots \\ A_M \end{bmatrix}$ : column vector of initial vibration amplitude The vibrations after the balancing weight thus obtained has been attached, i.e., the residual vibration amplitude $\epsilon_m$ may be obtained as follows:

$$\epsilon_m = A_m + \sum_{n=1}^{M} \alpha_{mn} W_n^I \tag{10}$$

wherein $W_n^I$: balancing weight
$\epsilon_m$: residual vibration amplitude

The residual vibration amplitudes are computed for all of the vibration amplitudes utilized for the computation of balancing weights, and then if these residual vibration amplitudes are below the allowable vibration amplitude value which is dependent on the size of a shaft, then the weight is utilized as the balancing weight required.

In case the residual vibration amplitudes are not below the allowable value, then the condition for balancing, such as balance-correcting planes are changed, followed by a repeated computation of a balancing weight.

Figure 9:
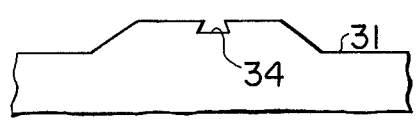
FIGS. 8 and 9 are partial views of a rotating portion having a groove adapted for use in attaching a balancing weight.
Figure 8:
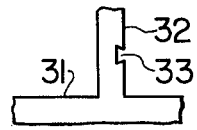

In this manner, the balancing weight is determined and then attached to the rotary shaft. For this purpose, part of a wheel disc 32 is formed with a weight-attaching groove 33, and then the weight is fitted in the groove 33. In the absence of the wheel disc 32, a shaft 31 is formed with a weight-attaching groove 34, as shown in FIG. 9, and then the weight is fitted therein.

After attaching a balancing weight to the rotary shaft, the rotary shaft is put into operation to confirm that the shaft vibrations are reduced, thus completing the balancing.

The adoption of this method permits a reduced number of balancing operations for reducing shaft vibrations at all critical speed and rated speeds in a shaft system including many coupled shafts. This provides a highly economical method for balancing a rotary machine.

Figure 10:
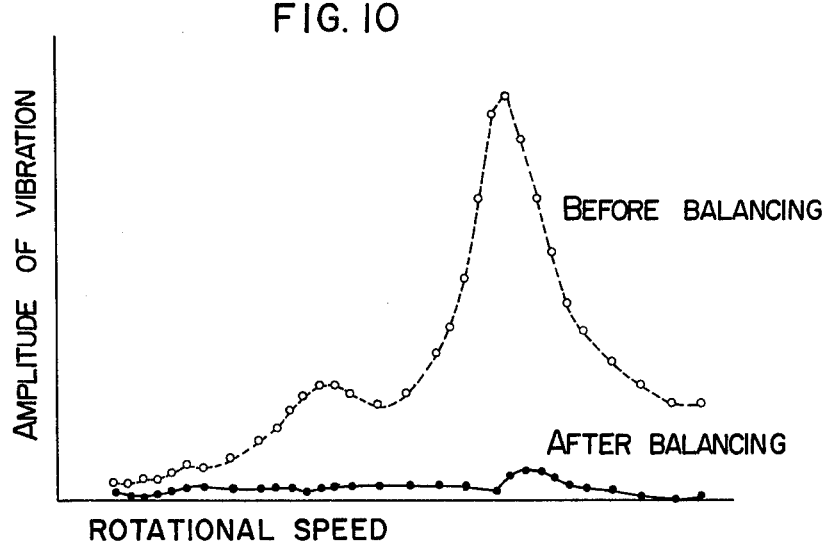
FIG. 10 is a view illustrative of the relationship between the rotational speed and the amplitude of vibration, representing the advantages of the balancing according to the invention.

FIG. 10 shows one example of test results of balancing for a model rotor. Two curves shown therein represent variations in vibration-amplitude due to rotational speed at a certain position, before and after balancing. In this figure, critical speeds appear in two positions. By utilizing this method, a balancing weight is determined from vibrations before balancing, and then the weight is attached to the shaft for measuring shaft vibrations. The result is given as curve like one after balancing. According to this method of balancing, shaft vibrations may be reduced to one-fifth according to one balancing operation. In this example, the shaft vibrations are reduced to one-tenth. Accordingly, even if the shaft vibrations are 10 times as large as the allowable level, the shaft vibrations may be reduced to within the allowable range with a single balancing operation. According to the application of the present invention, the shaft vibrations may be efficiently reduced with a single balancing operation.

Figure 11:
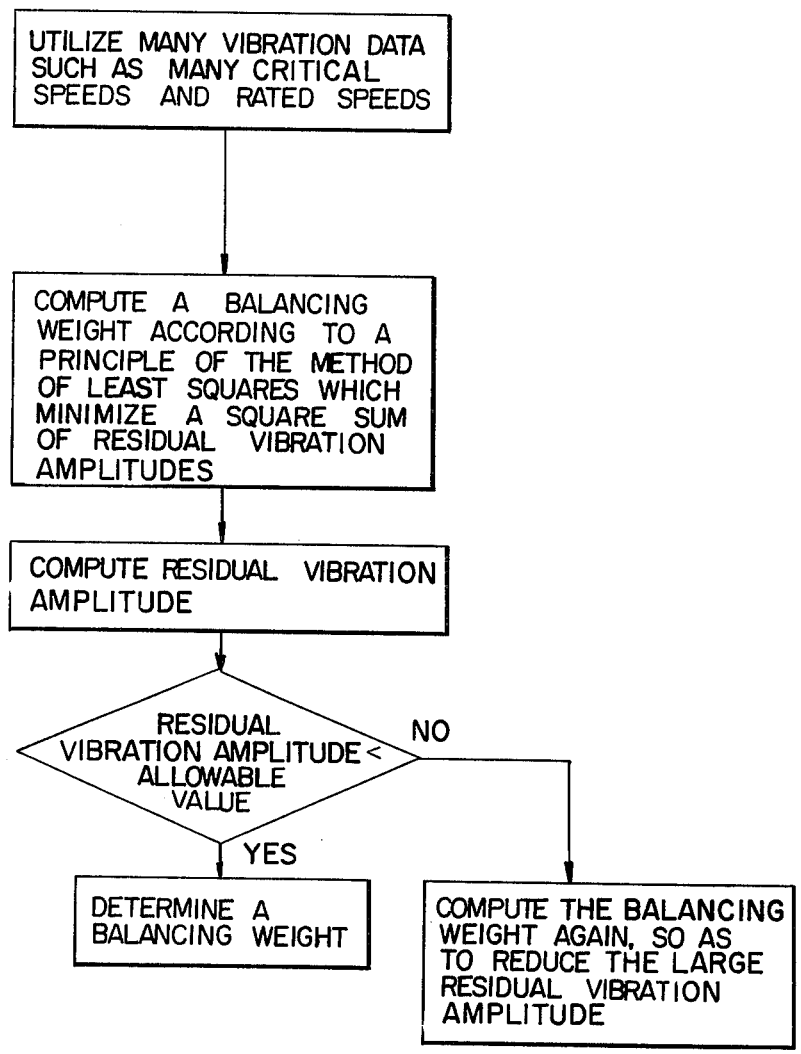
FIG. 11 is a view illustrative of a balancing method for particularly reducing a large residual vibration amplitude.

In the above example, if the residual vibration amplitudes remain out of an allowable range, after attaching balancing weights, then the configuration for computation should be varied for carrying out the computation again. FIG. 11 shows a method of balancing in such a case. Firstly, a balancing weight is computed according to a principle of the method of least squares, so as to minimize the sum of squares of residual vibration amplitudes by the vibration data, such as the critical speeds and rated speed, and then the residual vibration amplitudes are computed, when the weight thus obtained is attached. In case the residual vibration amplitudes are less than the allowable value, then the weight thus determined is used as the balancing weight.

If the residual vibration amplitudes are larger than the allowable value, then the computation is repeated, with attention paid to the large residual vibration amplitudes so as to reduce same.

The following equation is used as an evaluation function in place of the equation (7):

$$J = \sum_{m=1}^{M} |\epsilon_m|^2 \lambda_m \tag{11}$$

wherein
$\epsilon_m$: residual vibration amplitude
$\lambda_m$: factor

The factor $\lambda_m$ in the equation (11) is taken as being 1 for the first computation.

The result of this computation is in accord with the result obtained from the equation (7).

Computation is carried out for a balancing weight at the first cycle, and if the residual vibration amplitudes are more than the allowable value, then the factor $\lambda_m$ is computed according to the following equation:

$$\left. \begin{array}{l} S = \Sigma |\epsilon_m|^2 \lambda_m^{i-1} \\ R = \sqrt{S/M} \\ \lambda_m^{(i)} = |\epsilon_m|/R \end{array} \right\} \tag{12}$$

wherein
$\epsilon_m$: residual vibration amplitude
$\lambda_m^{i-1}$: a factor used in the preceding computation for a balancing weight
$\lambda_m^{(i)}$: factor for computation of a balancing weight in the next balancing
M: product of the number of measuring positions and number of measuring conditions A balancing weight is computed by utilizing $\lambda_m$ thus obtained. By repeating the aforesaid computation, a balancing weight may be determined so as to particularly reduce a large residual vibration amplitude.

Figure 12:
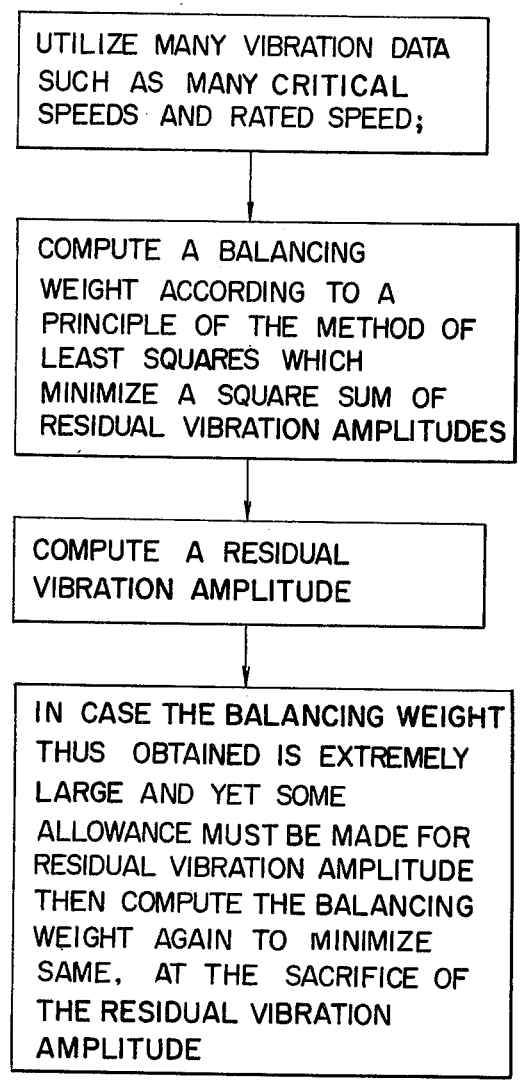
FIG. 12 is a view illustrative of the balancing method for reducing a balancing weight at the sacrifice of the residual vibration amplitudes, when the balancing weight obtained is extremely large.

Meanwhile, in case the balancing weight obtained is extremely large, and yet in case some allowance must be given to the residual vibration amplitudes, with an accompanying increase in residual vibration amplitudes, then the computation is repeated for a balancing weight so as to reduce the balancing weight, at the sacrifice of residual vibration amplitudes. FIG. 12 shows a method to be used in this case. Firstly, vibration data such as sexual critical speeds and rated speed are utilized to compute a balancing weight according to a principle of the method of least squares which minimizes the sum of squares of residual vibration amplitudes, and then the residual vibration amplitudes are computed, when this weight is attached. In case the balancing weight obtained is extremely large and yet some allowance is given thereto, then the balancing weight is computed again so as to reduce the balancing weight, at a sacrifice of the residual vibration amplitudes to some extent.

An evaluation function corresponding to the equation (7) is given as follows:

$$J = \sum_{m=1}^{M} |\epsilon_m|^2 \lambda_m + \sum_{n=1}^{N} |W_n|^2 \delta_n \tag{13}$$

wherein
$\epsilon_m$: residual vibration amplitude
$W_n$: weights for respective balance-correcting planes
$\delta n$: factor given as data
N: number of balance-correcting planes
$\lambda_m$: factor A balancing weight is determined in this manner and thus the desired balancing may be achieved with a reduced balancing weight.

The following is another method for determining balance-correcting planes by determining a balancing weight. In other words, several kinds of configurations are determined, and then a balancing weight for these configurations is determined, after which the best balancing weight is adopted as the final balancing weight. For instance, assume many balance-correcting planes, and then select a plurality of correcting planes among these, so that a balancing weight may be determined according to the foregoing method for a case where a balancing weight is attached to this balance-correcting plane. The best balancing weight is selected among these. The conditions for determining the best balancing weights are that the residual vibration amplitude is small, the balancing weight is small, and the number of the balance-correcting planes is minimized.

Figure 13:
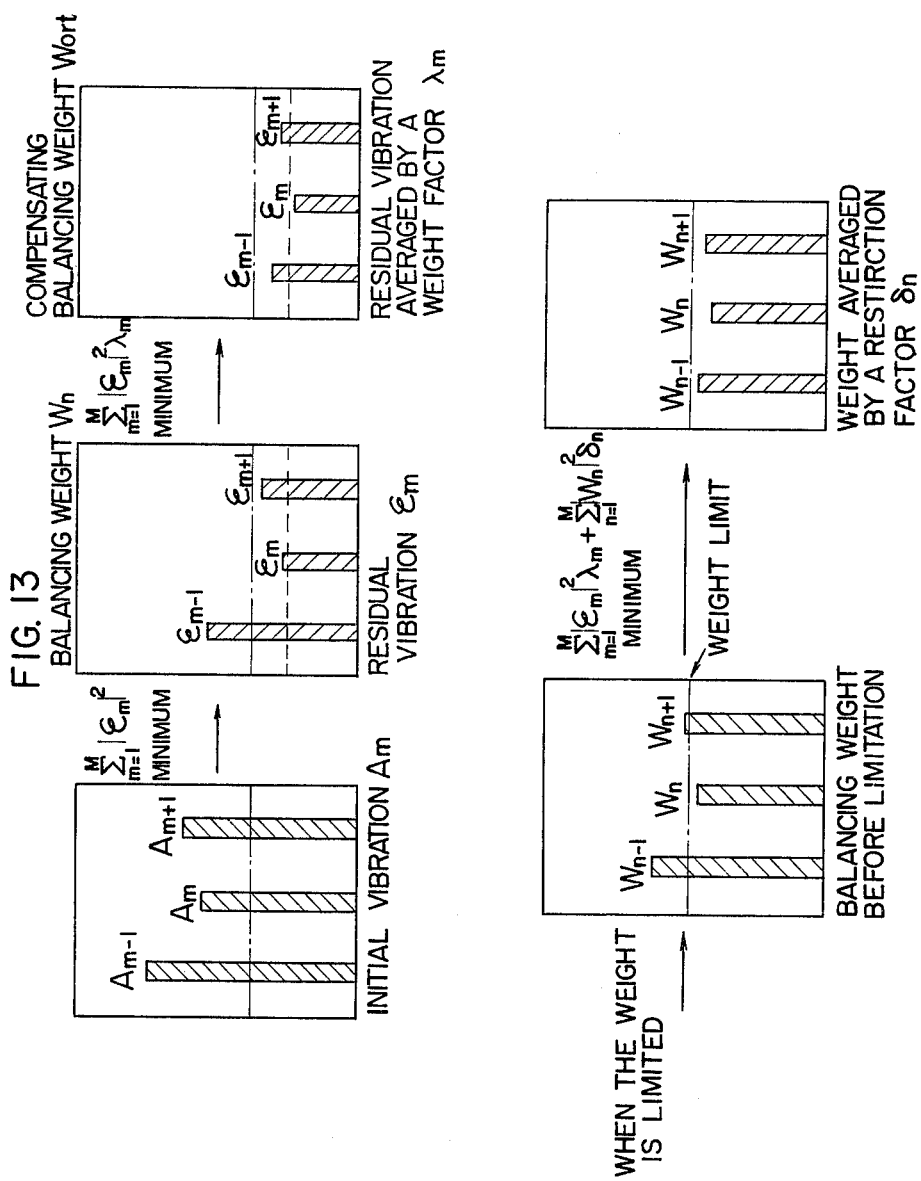
FIG. 13 is a flow chart of one embodiment of the invention.

The aforesaid procedure is shown in FIG. 13. In other words, in case the initial vibration amplitude $A_m$ is larger than an allowable value, a weight is obtained so as to reduce the residual vibration amplitude $\epsilon_m$ by minimizing $$\sum_{m=1}^{N} |\epsilon_m|^2.$$

In case the residual vibration amplitude $\epsilon_m$ is larger than an allowable value, then $$\sum_{m=1}^{M} |\epsilon_m|^2 \lambda_m$$

is minimized so as to obtain the weight which reduces the residual vibration amplitude.

In case the mass of a weight is limited, then $$\sum_{m=1}^{M} |\epsilon_m|^2 \lambda_m + \sum_{n=1}^{N} |W_n|^2 \delta_n$$

is minimized to obtain a compensated weight.

Figure 14:
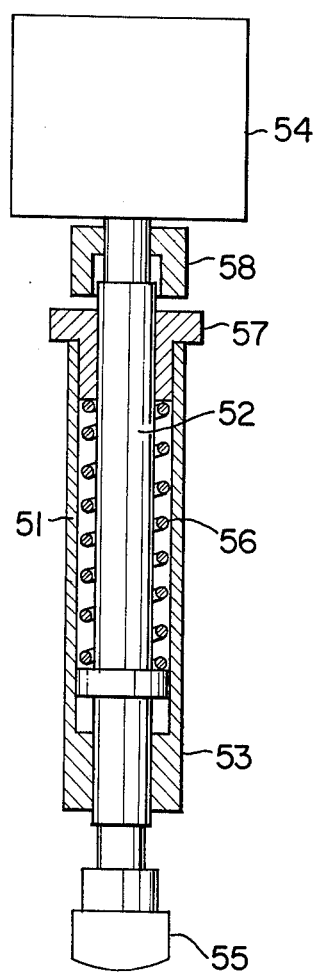
FIG. 14 is a view showing detailed arrangement of a vibration detecting pick-up.
Figure 15:
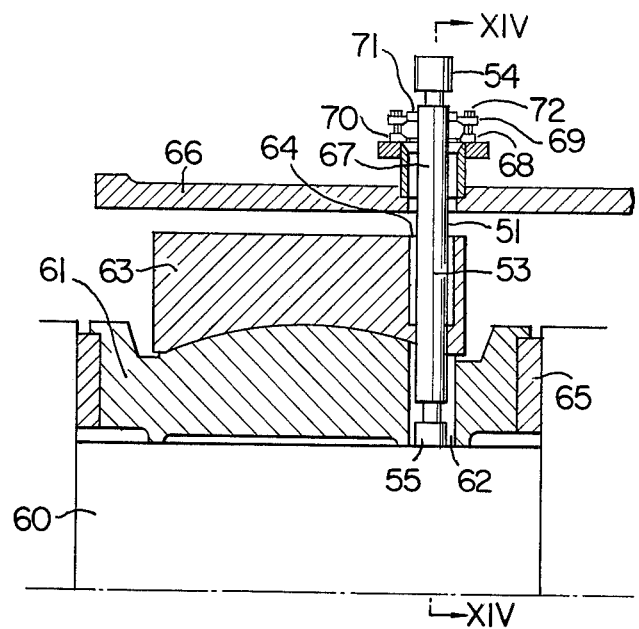
FIG. 15 is an axial cross sectional view of a vibration detecting pick-up.
Figure 16:
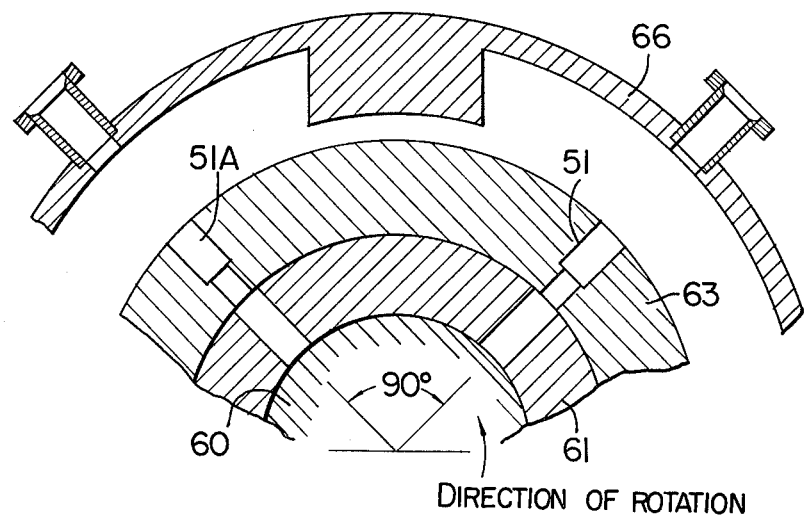
FIG. 16 is a cross-sectional view taken at a right angle to the shaft at a vibration detecting position, taken along the line XIV — XIV of FIG. 15.

FIGS. 14, 15, 16 show a vibration detecting method for a balancing system embodying the present invention.

A shaft-vibration measuring rod 51 is provided with (i) an hollow cylindrical outer case 53, (ii) a vibration pick-up 54 and tip 55 attached to the upper and lower ends of a contact shaft 52 movable along the length of the outer case 53 therein, (iii) a coil spring 56 and a spring-hold-down member 57 between the outer case 53 and the contact shaft 52 for imparting a suitable pressure to the tip 55 beforehand, and (iv) a stopper 58 in the vicinity of the vibration pick-up on the contact shaft 52, the aforesaid stopper 58 being adapted to adjust the tension of the coil spring 56.

FIG. 15 shows the measurement of vibrations in the shaft by using the shaft-vibration-measuring rod 51 of the aforesaid arrangement. The outer case 53 for the rod 51 is so positioned as to pierce through a rod hole 67 in bearing cover 66, then through a rod hole 64 in a bearing cover 63 and then a rod hole 62 in a bearing bushing 61, then the tip 55 at the lower end of the contact shaft 52 is brought into press contact with a rotary shaft 60. Then, the top end of the outer case 53 is secured to the bearing cover 66 by means of a metal piece 71. The metal piece 71 is secured to a spherical seat 70 supported through the medium of upper and lower spherical bearing surfaces 68, 69, which are secured to the bearing cover 66 by bolts 72.

Figure 17:
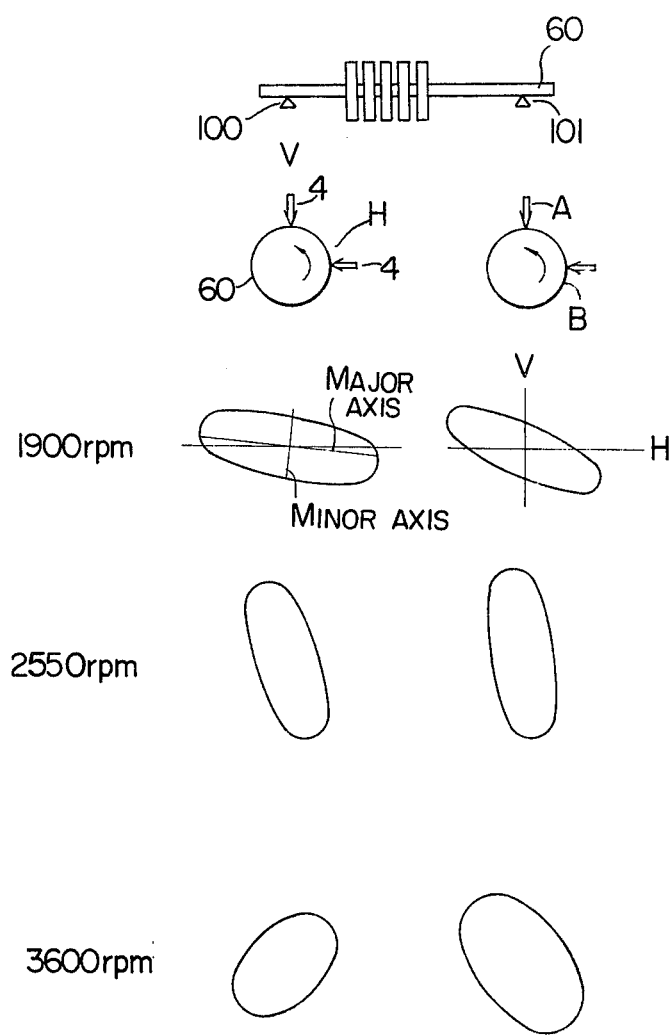
FIG. 17 is a view showing a locus of the deflection of a rotating shaft in a journal.

Two of the aforesaid rods 51 are attached in the same circumferential plane as shown in FIG. 16 at a right angle to each other. Vibrations at two point A and B may be measured by means of the rods 51 intersecting at a right angle with each other, the aforesaid points A and B being angularly spaced 90° in the circumferential direction of the rotary shaft 60. Vibrations x and y at the points A, B at a certain rotational speed ω may be expressed as follows:

$$x = |x| \sin(\omega t + \theta x)$$
$$y = |y| \sin(\omega t + \theta y) \quad (14)$$

wherein $|x|$, $|y|$, $\theta x$, $\theta y$ represent the amplitudes and phases at the points A and B, and are the values to be measured. In general, with a horizontal rotary machine of the turbine-generator type, the vibration characteristics at the points A and B are varied due to the anisotropy of bearings, with the result that the amplitudes $|x|$ and $|y|$ in the equation are varied. For this reason, the rotary shaft 60 at a given rotational speed describes an elliptic locus, when $(x,y)$ is plotted, taking $\omega t$ as a parameter. This elliptic locus varies its shape depending on the rotational speed. In other words, an angle $\psi$ formed by the x axis and a major axis varies. FIG. 17 shows a locus of the deflection of rotating shaft 60 at a critical speed and a rated speed which have been actually measured. Shown at 100, 101 are bearings. Since the rotating configuration of the shaft assumes the shape of an ellipse, the direction of measurement should not be limited to one direction. Otherwise, it may happen that vibrations in the vicinity of a minor axis of an ellipse are measured as a peak vibration due to a variation in the direction of the major axis of an ellipse, despite the fact that the measurement should have been given to the vibration in a position affording the largest amplitude, i.e., the position in the vicinity of a major axis of the ellipse. On the other hand, in case the measurement of vibrations is given in two directions, then the aforesaid shortcoming may be avoided, and at least one point will detect the vibrations in the vicinity of a major axis of the ellipse. This results in a highly accurate measurement of vibrating configuration of the rotary shaft 60 according to the bi-directional vibration measurement.

In general, the rotary shaft 60 includes an unbalanced mass, and thus the above unbalanced mass causes a centrifugal force, which in turn causes unbalanced vibrations in the rotary shaft 60. When the unbalanced vibrations become excessive, then the rotary shaft 60 will contact the bearing bushing 61, thereby leading to a damage in the rotary shaft 60. For this reason, it is mandatory that the unbalanced vibrations occuring in the rotary shaft 60 be reduced. Thus, balancing is required for reducing the unbalanced mass. For achieving highly efficient, and accurate balancing, vibration data should be measured with high accuracy.

The aforesaid bi-directional vibration measurement enables the highly accurate determination of balance-correcting weights (weight having a mass and an angle).

Description will be given of the method for determining the balance-correcting weights. Assume the influence coefficients $\alpha_{mn}^{(V)}$, $\alpha_{mn}^{(H)}$; ($n = 1, 2, \ldots, N \ldots$ number of balance-correcting planes; $m = 1, 2, \ldots, M \ldots$ number of measurements; V ... vertical direction; H ... horizontal direction), and initial unbalanced vibrations $A_m^{(V)}$, $A_m^{(H)}$. The residual vibration amplitudes $\epsilon_m^{(V)}$, $\epsilon_m^{(H)}$ are given as follows:

$$\epsilon_m^{(V)} = A_m^{(V)} + \sum_{n=1}^{N} \alpha_{mn}^{(V)} W_n \quad (15)$$
$$\epsilon_m^{(H)} = A_m^{(H)} + \sum_{n=1}^{N} \alpha_{mn}^{(H)} W_n$$

The following evaluation function J is so defined as to reduce the vibrations $\epsilon m^{(V)}$, $\epsilon m^{(H)}$:

$$J = \sum_{m=1}^{M} \{ |\epsilon_m^{(V)}|^2 \lambda_m^{(V)} + |\epsilon_m^{(H)}|^2 \lambda_m^{(H)} \} \quad (16)$$

wherein $\lambda m^{(V)}$, $\lambda m^{(H)}$ represent weight factors. Assume that the weight factor is 1, then an optimum balance correcting weight calculated to minimize the evaluation function J is given below:

$$W_{opt} = -\{\alpha^T \alpha\}^{-1} \alpha^T A \quad (17)$$

wherein, $$\rightarrow (n = 1, \ldots, N)$$

$$\alpha = \begin{bmatrix} \alpha_{mn}^{(V)}{}_x & -\alpha_{mn}^{(V)}{}_y \\ \alpha_{mn}^{(V)}{}_y & \alpha_{mn}^{(V)}{}_x \\ \alpha_{mn}^{(H)}{}_x & -\alpha_{mn}^{(H)}{}_y \\ \alpha_{mn}^{(H)}{}_y & \alpha_{mn}^{(H)}{}_x \end{bmatrix} (m \downarrow = 1, \ldots, M) \quad (18)$$

$$[A] = \begin{bmatrix} A_{mx}^{(V)} \\ A_{my}^{(V)} \\ A_{mx}^{(H)} \\ A_{my}^{(H)} \end{bmatrix} (m \downarrow = 1, \ldots, M) \quad (19)$$

$$W = \begin{bmatrix} W_{nx} \\ W_{ny} \end{bmatrix} (n \downarrow = 1, \ldots, N)$$

FIG. 18 shows a flow chart of the balancing system according to the present invention.

Vibrations at the point A and B, which have been detected by means of vibration pick-up 54 are fed to a tracking filter. The vibrations are analyzed into rotation-synchronous-unbalanced vibration components by this tracking filter. These unbalanced vibration components are printed as outputs by a type-writer in a data-processing device for monitoring the vibration data. Meanwhile, the influence coefficients which have been obtained at the points A and B in two directions beforehand are fed into a small-sized electric computer. In addition, excessive vibrations generated at specific speeds, i.e., vibrations at the point A and B at critical speed and rated speed are fed to the small-sized electric computer, thereby determining the balance-correcting weights by using the equation (18). Then, the residual vibration amplitudes at the points A and B, when the aforesaid balance-correcting weights are attached, are computed, followed by confirming that the vibrations remain within an allowable range. When the vibrations are out of the aforesaid allowable range, then the balance-correcting planes are changed, and computation in the preceding manner is then continued, until the residual vibration amplitudes fall within the allowable range. Meanwhile, the aforesaid small-sized electric computer may be built in the data processing device.

A description will now be given of the results of an actual balancing using the aforesaid vibration measuring system. When the rotational speed of the rotor was increased, excessive unbalance in bearing No. 1 and bearing No. 2 at the opposite ends of the rotor took place. For reducing the aforesaid excessive unbalanced vibrations, the following two types of balancing tests were given;

(i) measurement of vibrations in one direction (vertical direction)

(ii) measurement of vibrations in two directions (vertical and horizontal directions).

Figure 19A:
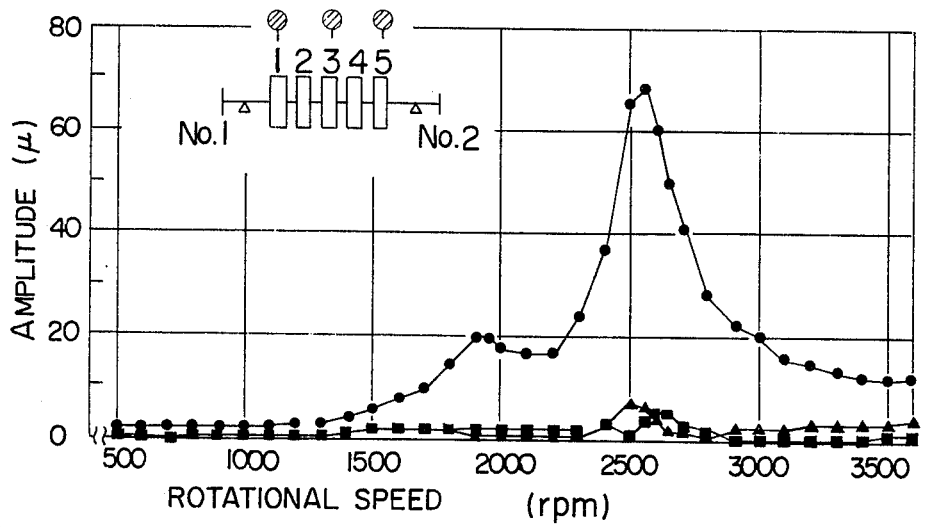
FIGS. 19a and 19b shows the results of balancing using a balancing system according to the invention.
Figure 19B:
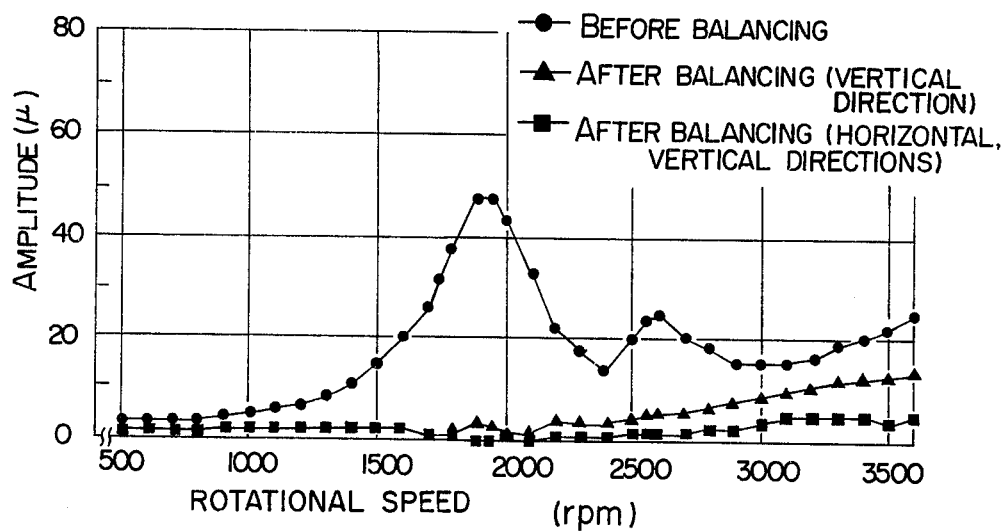

FIG. 19 shows the results of balancing of the bearing No. 2 in the horizontal and vertical directions.

What is claimed is:

1. A balancing method for a multi-rotor shaft comprising the steps of measuring initial vibration amplitudes at at least one desired vibration measuring point on the shaft; determining influence coefficients representative of vibration amplitudes at the at least one vibration measuring point when a unit weight is attached to at least one predetermined balancing plane on said shaft; and determining at least one correction weight so as to reduce the values of residual vibration amplitudes at the at least one measuring point; the values of the residual vibration amplitudes being dependent on the initial vibration amplitudes, influence coefficients and the at least one correction weight on the at least one balancing plane; wherein the step of determining influence coefficients includes determining the influence coefficients for different measuring conditions; and the step of determining the at least one correction weight includes determining the at least one correction weight by the method of least squares so as to minimize the sum of squares of the residual vibration amplitudes.

2. A balancing method as claimed in claim 1, further comprising the steps of:

determining the sums of products of squares of the at least one correction weight and factors corresponding to respective correction weights, for respective balancing planes;

determining compensated correction weights for making the total sum of said sums of products and sums of squares of said residual vibration amplitudes a minimum; and making all of said compensated correction weights smaller than an allowable value.

3. A balancing method as claimed in claim 1, characterized in that said different measuring conditions include a plurality of vibration measuring points.

4. A balancing method as claimed in claim 1, characterized in that said different measuring conditions include a plurality of revolutionary speeds.

5. A balancing method as claimed in claim 1, characterized in that said different measuring conditions include a plurality of revolutionary speeds and a plurality of vibration measuring points.

6. A balancing method as claimed in claim 1, characterized in that said various measuring conditions include a plurality of revolutionary speeds and biaxial measurements in two substantially orthogonal directions.

7. A balancing method as claimed in claim 1, characterized in that said different measuring conditions include a plurality of revolutionary speeds, a plurality of vibration measuring points and biaxial measurements in two substantially orthogonal directions.

8. A balancing method for a multi-span rotor shaft comprising the steps of measuring initial vibration amplitudes at at least one desired vibration measuring point on the shaft; determining influence coefficients representative of vibration amplitudes at the at least one vibration measuring point when a unit weight is attached to respective ones of predetermined balancing planes on the shaft; and determining at least one correction weight so as to reduce the values of residual vibration amplitudes at the at least one vibration measuring point, the values of residual vibration amplitudes being dependent on the initial vibration amplitudes, influence coefficients and the at least one correction weight on the balancing planes; wherein the step of determining influence coefficients includes determining the influence coefficients for different measuring conditions; and the step of determining the at least one correction weight includes determining by the method of least squares, at least one compensated correction weight for minimizing the sum of squares of respective residual amplitudes of respective vibration measuring positions multiplied by a weight factor of an i th step given by the equation:

$$S = \sum_{m=1}^{M} |\epsilon_m|^2 \lambda_m^{(i-1)}$$

$$R = \sqrt{S/M}$$

$$\lambda_m^{(i)} = |\epsilon_m|/R \ (i = 1, 2, ....., \lambda_m^{(0)} = 1)$$

where, $\epsilon_m$ is the residual vibration amplitude, $\lambda_m^{(i)}$ denotes a weight factor used in the step of number $i$ computation for a compensating correction weight, and M denotes a product of the number of measuring positions and number of measuring conditions, S and R are parameters utilized for simplification of the equation; and repeating the above stated steps until all residual vibration amplitudes with the at least one compensated correction weight attached to the rotor shaft becomes lower than an allowable value.

9. A balancing method as claimed in claim 8, further comprising the steps of:

determining the sums of products of squares of said compensated correction weights and values of said factor corresponding to respective correction weights for respective balancing planes; and making all of recompensated correction weights smaller than an allowable value, said recompensated correction weights making the total sum of said sums of products and sums of squares of residual vibration amplitudes at respective vibration measuring points multiplied by said weight factors a minimum.

* * * * *